Figure 1:
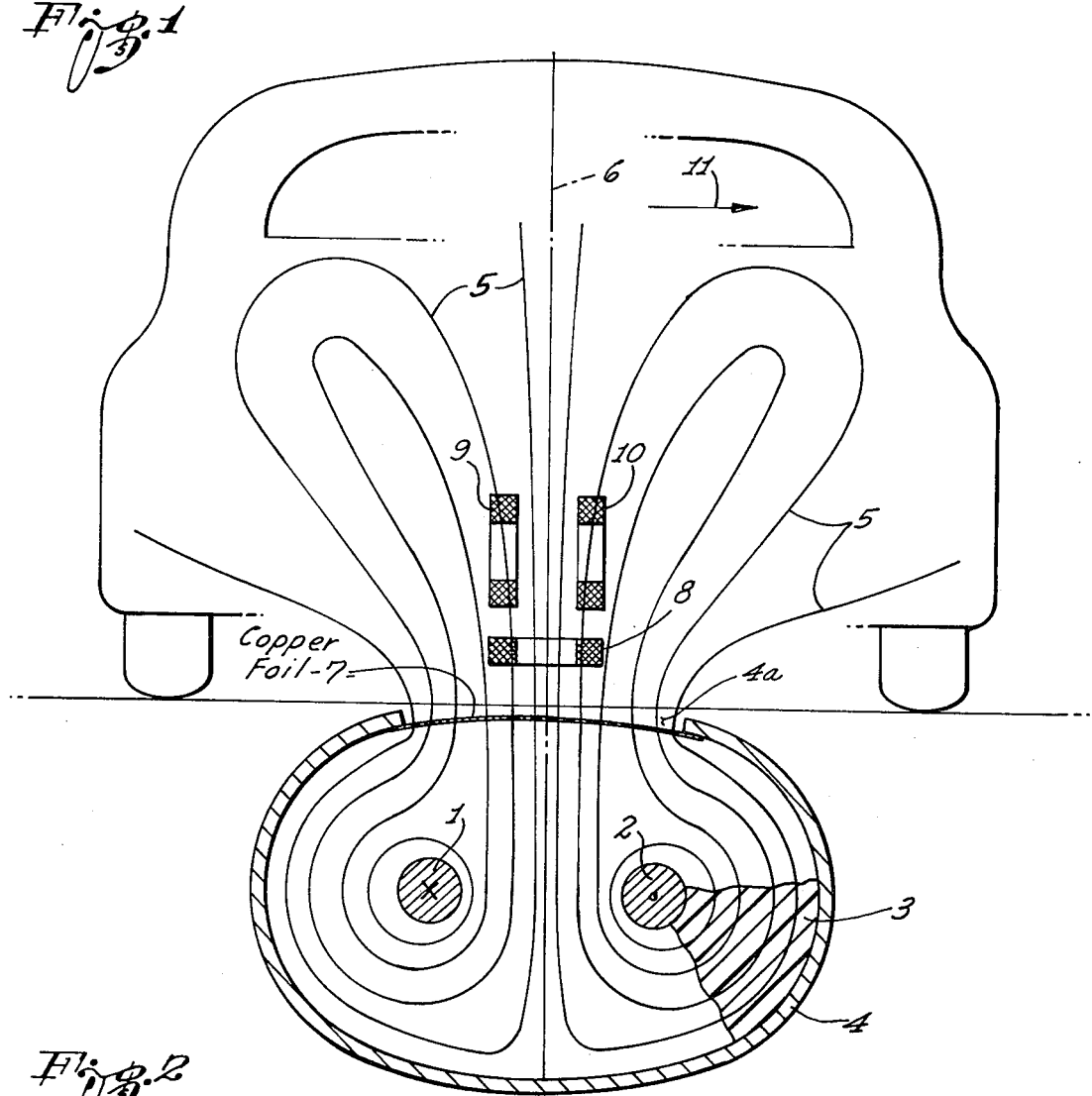

United States Patent
Martin

[15] 3,668,573
[45] June 6, 1972

[54] HIGH-FREQUENCY CABLE
[72] Inventor: Helmut Martin, Hannover, Germany
[73] Assignee: Kabel-Und Metallwerke Gutehoffnungshutte Aktiengesellschaft, Hannover, Germany
[22] Filed: Feb. 3, 1971
[21] Appl. No.: 112,306

[30] Foreign Application Priority Data
 Feb. 24, 1970    Germany ..................... P 20 08 398.1

[52] U.S. Cl. ............................. 333/84 R, 333/96, 333/95 S
[51] Int. Cl. ......................................................... H01p 3/02
[58] Field of Search ..................... 333/84, 84 L, 96, 95 S; 343/767–771; 340/258 R, 258 A, 258 B, 258 C, 258 D

[56] References Cited
UNITED STATES PATENTS
2,580,155  12/1951   Brannen ........................... 340/258 C
3,534,303  10/1970   Hafner .............................. 333/95 S Primary Examiner—Herman Karl Saalbach
Assistant Examiner—Marvin Nussbaum
Attorney—Smyth, Roston & Pavitt

[57]        ABSTRACT
An h.f. cable with two conductors in a dielectric substance enveloped by a shield with an axial slot which is covered by a copper foil.

7 Claims, 4 Drawing Figures

INVENTOR:
Helmut Martin

HIGH-FREQUENCY CABLE

The present invention relates to a high frequency cable, wherein an electromagnetic field is developed in a dielectric substance within the cable, the dielectric material being in turn enveloped by a metallic shield having an axial gap or slot, so that a partial outer field develops.

Frequently, h.f. signals are to be transmitted from a stationary transmitter to a movable receiver, or reverse, for example, for the transmission of video signals from a stationary TV camera to receiving equipment on a vehicle, there are used cables which conduct the h.f. energy, supposedly with little actual loss, but the cable also radiates h.f. electromagnetic energy towards the vehicle as moving, e.g., on rails, along the cable. It is already known to utilize symmetric and unshielded h.f. cables, for example, so-called ribbon cables to this purpose. Such cables, however, suffer losses and possess radiation characteristics heavily dependent upon weather and other ambient conditions. This is particularly true when such a cable is laid out flat, on any ground, in the open.

Another type of radiating cable, being approximately of the coaxial variety, has an inner conductor and an outer conductor wherein the outer conductor is provided with a slot exposing insulation on he inner conductor. Electromagnetic radiation is transmitted through the slot in the outer conductor. One drawback of such a device lies in the fact that the intensity of the radiation field decreases rapidly with increasing distance from the cable. In order to attain sufficiently strong input for a receiver, the power input for the cable must be rather high. However, energy transmission through the cable is limited by the dimensions thereof. Therefor, a third possibility for obtaining the necessary signal strength could thus be seen in providing an h.f. cable of correspondingly larger dimensions. However, not only is such a cable more expensive and, therefore, uneconomical, it is also considerably heavier which poses problems for installation, etc.

Another drawback of the known h.f. cables lies in the following: the field as inductively or capacitively coupled to the input of a pick device such as a receiver has stray components to a considerable extent and, accordingly, heavy dielectric and eddy current losses are incurred. Thus, there is considerable dissipation and loss of energy as between transmitter and receiver.

It is an object of the present invention to provide a high frequency cable with a concentrated, useful external field while any stray field that is produced remains small so that only slight losses are incurred by operation of the cable. In other words, it is an object of the present invention to render more radiated energy available to the receiver.

In accordance with one aspect of the present invention in the preferred embodiment thereof, it is suggested to use a pair of similar, symmetrically disposed conductor cores, respectively serving as transmission line and return path. The two conductor cores are enveloped by a shield with at least one slot in a symmetrical and/or aligned arrangement with a plane of symmetry as defined between the two conductor cores. The advantage of such symmetric construction for the field generation and radiation emission is to be seen in the resulting focusing effect for the field lines, particularly in the plane of symmetry, preferably as extending symmetrically through the slot in the shield. The slit in the screen may be quite narrow for concentrating the useful field and maintaining the stray field small accordingly.

It is another feature of the invention to cover the slot in the shield with a metallic layer of good electrically conductive material and low magnetic permeability, for example, copper. That metallic layer should be thin so that the electrical component of the electromagnetic field does not emerge from the cable while the magnetic component of the field is attenuated only negligibly due to inevitably occurring eddy currents. In this manner, the overall losses of the cable are diminished further as dielectric losses are not incurred outside of the cable.

Figure 2:
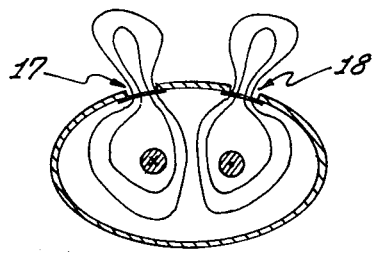
Figure 3:
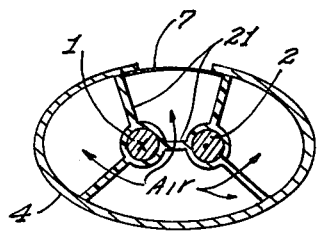
Figure 4:
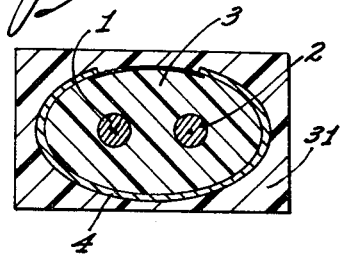

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a cross-section through a transmitting cable constructed in accordance with the preferred embodiment of the present invention, the illustration includes schematic showing of relative position of a particular receiving equipment; and FIGS. 2, 3 and 4 are schematic constructions of examples still pertaining to the preferred embodiment of the present invention.

Proceeding now to the detailed description of the drawings, in FIG. 1 is illustrated a pair of conductor cores 1 and 2 of which conductor 1, for example, is the signal line proper and conductor 2 establishes the return path. This, however, is an arbitrary assignment and not of particular significance. The two cores are embedded or encased in a dielectric material 3. The entire arrangement is enveloped in a metallic shield 4.

The two conductors are disposed symmetrical to a plane 6 of symmetry, i.e., the plane 6 runs through an axial center line between cores 1 and 2. That plane follows the longitudinal contour of the cable when installed and, therefore, includes always the center axis of shielding 4. The shield has an axially extending slot 4a which is likewise disposed symmetrically to the plane of symmetry 6, i.e., the plane traverses the axial center line of the slot. The slot or gap 4a is covered by a thin metallic foil 7, for example, made of copper.

The field as generated by the pair of cores 1 and 2 is depicted by field line 5. However, only the magnetic component of that field emanates from the cable, the electric component is barred by the foil 7.

It can readily by seen that h.f. radiation field 5 extends symmetrical to the plane of symmetry 6. The field potential within that plane of symmetry is uniform and may arbitrarily be assumed as having value zero. The field will then exhibit different polarities on both sides of plane 6. Due to the particular arrangement of the cores of the pair within the metallic shield, the field is strongly concentrated in and along plane 6 and traversing the gap and thin foil 7. This concentration can readily be used for control purposes.

It may be assumed, for example, that a high frequency cable made in accordance with the invention and as illustrated in FIG. 2 is laid out on a highway. It is further assumed that a vehicle is equipped with three pick up coils 8, 9 and 10, and they are disposed in the vehicle in relation to each other as illustrated. The h.f. cable, as so installed, can be used for guiding and steering the vehicle automatically along the highway.

Assuming the vehicle to have the position illustrated, coil 8 is traversed by concentrated field lines; particularly the center axis of coil 8 coincides with and runs in and along plane 6. Thus, a maximum amount of field lines as emerging from the cable traverses coil 8 and, therefore, the voltage induced in coil 8 has a maximum value, as compared with a laterally displaced position of the coil. Coils 9 and 10 are arranged symmetrically to the axis of coil 8 in the vehicle, and as long as coil 8 (and the vehicle) has that symmetrical position, the two coils 9 and 10 are traversed by field lines of equal intensity, but in opposite direction so that oppositely polarized voltages but of similar amplitude are induced in the two coils 9 and 10.

This situation as described remains as long as the vehicle is in that symmetrical position along the cable assumed to be the correct and desired position above the cable. In case of a deviation and lateral displacement from this correct position, for example, in direction of arrow 11, coil 8 will no longer sense maximum voltage, and the voltage induced in coil 9 increases while the voltage induced in coil 10 decreases. The several voltages as so induced in the coils may be fed, for example, to the input circuit of an automatic steering control apparatus to provide an error signal for such control apparatus, to steer the vehicle back into the correct position, i.e., back to a symmetrical and centered position above the cable as defined and illustrated. Within a certain range of maximum permissible displacement, the vehicle can, therefore, be steered back into the correct path and to be maintained, for example, in the center of a highway lane.

The shield 4 is illustrated as having oval cross-section. However, there is no mandatory requirement for such a contour; instead, the shield may have circular or rectangular cross-section. For the particular purpose illustrated and described, it is of advantage to use a single slot. However, there are cases where different control signals are to be derived from the cable to provide for, possibly, different and independent control operations. As schematically illustrated in FIG. 2, there is provided a cable wherein the outer shield 4 has two slots 17 and 18. The individual slot, therefore, is no longer symmetrically disposed in relation to the cables. Some deterioration of the radiation characteristics of the cable is inevitable due to disturbed field. Nevertheless, it can readily be seen that there is a resulting spatial separation of the two fields as energizing from the two slots, each field can be picked up independently by respectively laterally disposed pick up devices. The signals in this case and as propagating through the cable may well be different carrier modulated frequencies picked up by differently tuned receivers, that are likewise spatially separated.

As shown in FIG. 3, the dielectric substance between the pair of cores 1 and 2 may be a gas such as air. The shield and conductor construction is basically similar to the one shown in FIG. 1 (or it could be as shown in FIG. 2). Nevertheless, there are included additionally spacer means 21 to position the shield in relation to the two conductors 1 and 2 and to maintain the two conductors in fixed distance from each other along the extension of the cable. It should be mentioned, however, that use of a solid dielectric material, as shown in FIG. 1, is the preferred form of practicing the invention so that a solid dielectric serves simultaneously as spacer and support for shield and conductor cores.

As shown in FIG. 4, the h.f. cable may be encased by a plastic sheathing, coating, housing or the like, basically of arbitrary cross-section. It was found to be most practical to use a plastic housing with rectangular cross-sections in which the shield is embedded. One of the long sides of that rectangle may run close to the slot in the shield, or even in alignment therewith.

The use of a copper foil as cover for the gap is most appropriate. In most cases only the inductive component of the emanating field is of interest. The electrical component could well be disregarded. This is particularly the case if, as shown in FIG. 1, the pickup means is a coil that responds to that magnetic component. A further advantage of providing a cover for the slot is that the environment will exhibit little or no influence on the transmission of high frequency energy. Also, any dielectric substance that surrounds the cable may be disregarded if the electric component of the field beyond the cable is eliminated.

The invention is not limited to the embodiments described above but all changes and modifications thereof not constituting departures from the spirit and scope of the invention are intended to be included.

I claim:

1. A high frequency cable comprising a pair of spaced, elongated conductor cores extending along an axis;
   dielectric material disposed around the core and
   a shield enveloping the cores of the pair and the dielectric material and having at least one axially extending slot for developing a partial outer field.

2. A high frequency cable, as set forth in claim 1, wherein the slot is disposed axially symmetrical to the cores of the pair, for concentrating the field lines symmetrically to a plane through a center line between the cores and an axial center line through the slot.

3. A high frequency cable, as set forth in claim 1, the shield having a plurality of parallelly extending slots.

4. A high frequency cable, in accordance with claim 1, wherein the dielectric material is air, there being spacer and support means for supporting the shield on the cores.

5. A high frequency cable, as in claim 1, the dielectric material being a solid material serving as spacer for the two conductor cores as well as support for the shield in relation to the cores of the pair.

6. A high frequency cable as in claim 1, the slot being covered by a thin metal foil of low magnetic permeability and high electric conductivity.

7. A cable as in claim 6, the foil being made of copper.

* * * * *